United States Patent
McAleer

(10) Patent No.: US 9,775,309 B2
(45) Date of Patent: Oct. 3, 2017

(54) ROTATING, SOIL FILLED INTERNALLY IRRIGATED GEOTROPIC RESPONSE LIMITING GROWING APPARATUS FOR USE IN ACCOMPLISHING WATER, SPACE, LABOR, ENERGY AND NUTRIENT EFFICIENT AGRICULTURAL PRODUCTION

(76) Inventor: Gary Edward McAleer, New Milford, CT (US)

( * ) Notice: Subject to any disclaimer, the term of this patent is extended or adjusted under 35 U.S.C. 154(b) by 0 days.

(21) Appl. No.: 13/596,981

(22) Filed: Aug. 28, 2012

(65) Prior Publication Data
US 2014/0059928 A1    Mar. 6, 2014

(51) Int. Cl.
A01G 31/02    (2006.01)
A01G 31/04    (2006.01)

(52) U.S. Cl.
CPC ............ *A01G 31/047* (2013.01); *A01G 31/02* (2013.01); *Y02P 60/216* (2015.11)

(58) Field of Classification Search
CPC ....... A01G 31/02; A01G 31/04; A01G 31/047
USPC .................................. 47/62 R, 62 N, 82, 83
See application file for complete search history.

(56) References Cited

U.S. PATENT DOCUMENTS

| | | | | |
|---|---|---|---|---|
| 3,529,379 A | * | 9/1970 | Ware | 47/17 |
| 3,882,634 A | * | 5/1975 | Dedolph | 47/65 |
| 3,909,978 A | * | 10/1975 | Fleming | 47/82 |
| 3,973,353 A | * | 8/1976 | Dedolph | 47/65 |
| 4,130,072 A | * | 12/1978 | Dedolph | 111/100 |
| 4,181,217 A | * | 1/1980 | Huls | B65G 23/04 |
| | | | | 193/37 |
| 4,756,120 A | * | 7/1988 | Arledge | 47/59 R |
| 5,031,359 A | * | 7/1991 | Moffett, Jr. | A01G 9/022 |
| | | | | 47/82 |
| 5,201,860 A | * | 4/1993 | Richardson | 47/39 |
| 5,515,648 A | * | 5/1996 | Sparkes | A01G 7/045 |
| | | | | 47/65 |
| 5,584,141 A | * | 12/1996 | Johnson | 47/65 |
| 6,378,246 B1 | * | 4/2002 | DeFoor | A01G 9/12 |
| | | | | 47/39 |
| 6,604,321 B2 | * | 8/2003 | Marchildon | 47/62 R |
| 6,840,007 B2 | * | 1/2005 | Leduc et al. | 47/62 C |
| 7,168,206 B2 | * | 1/2007 | Agius | 47/62 R |
| 7,559,173 B2 | * | 7/2009 | Brusatore | 47/82 |
| 7,730,663 B2 | * | 6/2010 | Souvlos et al. | 47/62 C |
| 7,818,917 B2 | * | 10/2010 | Brusatore | 47/59 R |

(Continued)

FOREIGN PATENT DOCUMENTS

DE    3837033 A1 *  5/1990

OTHER PUBLICATIONS

Machine translation of DE 3837033 A1.*
Amazon Listing: Wooster Brush Roller Frame, First Available Jun. 15, 2006.*

*Primary Examiner* — Marc Burgess
(74) *Attorney, Agent, or Firm* — Patrick M. G. Reilly

(57) ABSTRACT

The present invention is an apparatus and associated methods for more efficiently managing factors critical to the efficient production of beneficial plant life. The apparatus in one embodiment is a cylinder filled with a plant growth medium. The cylinder receives seedlings by the use of baskets that are inserted into the external surface of the cylinder. The seedlings are irrigated by fluids received along the axis of the cylinder. The axis of the cylinder is oriented perpendicular to the force of gravity (parallel to the earth's surface) and rotates along the cylinder axis.

2 Claims, 13 Drawing Sheets

(56) References Cited

U.S. PATENT DOCUMENTS

| | | | |
|---|---|---|---|
| 7,941,966 B2* | 5/2011 | Foix Robert | A01G 13/0237 47/20.1 |
| 7,984,586 B2* | 7/2011 | Brusatore | 47/59 R |
| 8,122,643 B2* | 2/2012 | Harder | A01G 9/02 47/44 |
| 8,359,789 B2* | 1/2013 | Marchildon | 47/79 |
| 8,429,850 B2* | 4/2013 | van Zijl | 47/62 R |
| 2006/0196118 A1* | 9/2006 | Brusatore | 47/83 |
| 2006/0218860 A1* | 10/2006 | DeFrancesco | 47/62 R |
| 2008/0110088 A1* | 5/2008 | Brusatore | 47/79 |
| 2009/0064577 A1* | 3/2009 | Lee | 47/62 R |
| 2011/0016782 A1* | 1/2011 | Harder | A01G 9/02 47/66.1 |
| 2011/0061294 A1* | 3/2011 | Brusatore | 47/83 |
| 2013/0061521 A1* | 3/2013 | Cudmore | 47/83 |

* cited by examiner

ROTATING, SOIL FILLED INTERNALLY IRRIGATED GEOTROPIC RESPONSE LIMITING GROWING APPARATUS FOR USE IN ACCOMPLISHING WATER, SPACE, LABOR, ENERGY AND NUTRIENT EFFICIENT AGRICULTURAL PRODUCTION

CROSS-REFERENCE TO RELATED APPLICATIONS

The present application claims the benefit of and priority from U.S. Provisional Patent Application Ser. No. 61/496,260, filed Jun. 13, 2011, the entire disclosure of which is hereby incorporated by reference herein.

STATEMENT REGARDING FEDERALLY SPONSORED RESEARCH OR DEVELOPMENT

No federally sponsored research or development was involved in the creation or development of this invention.

THE NAMES OF THE PARTIES TO A JOINT RESEARCH AGREEMENT

There are no others parties joined in the research associated with the creation and development of this invention.

BACKGROUND OF THE INVENTION

The present invention is an apparatus for use in improving the growth rate, size at maturity, water consumption, general health, and production costs associated with the cultivation of beneficial plant life. The word "beneficial" meaning those plants cultivated for nutritional, industrial, medical or ornamental use.

It has been demonstrated to a point of common knowledge that rotating a plant during its growing cycle serves to alter its geotropic (gravity), phototropic (light), and hydrotropic (water) responses. The present invention combines the modification of all such innate responses via rotation with other features and components to comprehensively maximize the irrigation, fertilization, space, power, labor and cost efficiencies associated with the production of beneficial plant life.

One of the common limiters of beneficial plant growth is access to a supply of water sufficient to sustain robust growth. Typically, open field cultivation requires the delivery of large volumes of water via some form of broadcast sprinkling or spraying, or via free flowing irrigation channels. In all instances, the amount of water delivered to plants in these ways will be greatly in excess of the amount actually consumed by the plants.

For the most part, water delivered by broadcast or channel style irrigation methods is lost to evaporation, runoff, and seepage. Wasteful irrigation practices contribute to the stress of limited water supplies as water lost to such practices may require a lengthy period of time before returning to local water tables.

While some alternatives to largely wasteful broadcast and channel style irrigation such as controlled drip style systems may reduce water lost due to evaporation and seepage, the expense of such systems is often prohibitive, and the amount of water delivered to desirable plants versus the amount actually consumed by those plants still differs greatly.

Other alternative forms of cultivation such as hydroponics and aquaponics are also water intensive. While estimates vary, studies have demonstrated that as much as 20 to 30 gallons of water are required to grow a single head of lettuce utilizing either of these growing modalities. In addition, the nutrients utilized in hydroponics must be placed in solution via a process that requires substantial amounts of water adding to the accumulated water use footprint of this system of cultivation.

In controlled trials utilizing a working prototype, the present invention has routinely grown desirable plants to maturity at a consumption rate of approximately three gallons of water per plant with a correspondingly significant reduction in the amount of nutrients (fertilizers) and pesticides required to sustain robust growth and typically larger plants at maturity.

The present invention accomplishes exceptional water use efficiencies by rooting plants in a solid growing medium that is contained within a partially enclosed cylinder. This contained medium is hydrated via a unique drip and wick irrigation system limiting waste due to evaporation, runoff, or seepage while providing an exceptionally even hydration pattern within the growing medium.

With global water supplies in crisis, water conserving systems and devices of all kind are of unique value. The present invention is capable of providing this benefit, among others, on a large scale.

In addition to contributing to the stresses associated with dwindling water supplies, open field agriculture, and to a lesser extent hydroponic and aquaponic cultivation, introduce millions of tons of toxic chemicals into the global environment every year. Runoff containing agricultural chemicals is a significant source of pollution in lakes, rivers and oceans.

The present invention cultivates desirable plant life in a contained growing medium. This modality results limits runoff eliminating the majority of the pollutants associated with open field, hydroponic and aquaponic cultivation.

The entomological factors associated with the cultivation of plants in the ground compel the use of significant amounts of pesticides and fungicides to maintain the health of such plants. The toxins associated with agricultural pesticides and fungicides have been found to be hazards to human and other forms of animal life.

The present invention greatly reduces the need for pesticides by rooting plants in cylinders mounted in racks or towers. This elevates such cylinders well above the ground where many plant destroying pests and pathogens reside. In addition, the present invention employs a contained growing medium that is shielded from many of the air, water and soil borne pests and pathogens that give rise to the need for the application of pesticides and fungicides in open field production settings.

In controlled trials utilizing a working prototype, desirable plants have been grown to maturity without the application of toxic pesticides or fungicides. Any reduction in the consumption of pesticides and fungicides in the cultivation of beneficial plant life would result in a corresponding reduction in all forms of undesirable pollution related to such use.

The two dimensional nature of conventional open field, hydroponic and aquaponic agriculture requires a relatively large amount of horizontal space. In the instance of commercial farming, this requirement translates into a need for very large parcels of arable land. This need conflicts with the diminishing availability of arable parcels and an increasing global demand for food crops.

The present invention employs more vertical space than horizontal space. The growing medium filled cylinders employed in this invention are designed for stationary mounting in a vertical rack or tower. Unlike other designs employing the planetary rotation of a small number of smaller, light weight cylinders, the present invention accommodates vertical arrangements of cylinders of an unlimited number and size.

Projections based upon production yields obtained during trials demonstrate that the land required for the cultivation of a given volume of beneficial plants utilizing conventional open field farming methods can be reduced by approximately 50% when using the present invention. Further, cultivation employing the present invention does not require arable land. This factor serving to further relieve stresses on arable land reserves.

Conventional open field farming requires extensive use of complex and expensive farm equipment. In most instances, this equipment requires the large scale consumption of fossil fuels. The cost of such equipment combined with the cost of fuel, maintenance, insurance and labor for operators contribute to pricing pressures on desirable plant life.

The present invention utilizes a proprietary planting/harvesting basket (Hereinafter "basket) to facilitate the rapid seeding, starter growth, transplantation, growing and harvesting of plants. Seeds are germinated in baskets then grown to produce seedlings, sometimes called "starters".

The roots of plants grown in baskets pass easily through the wire frame of the basket while stabilizing a root ball within the bounds of the basket. Prior to transplanting, a hole sized to the size and shape of a basket is excavated in the growing medium contained in a cylinder through a perforation in its outer casing. A basket containing a starter plant is inserted into the excavated hole then twisted to engage two locking tabs located under the upper retaining ring of the basket. The basket holds the starter plant in place until it roots expand into the growing medium in the cylinder.

With the exception of automated seeding, all aspects of the transplanting, growing and harvesting of plants grown in the present invention can be accomplished without machines or the need of generating or consuming mechanical energy. Eliminating the use of farm machines in the cultivation of desirable plant life should produce a positive effect on pricing pressures while eliminating undesirable emissions related to the consumption of fossil fuels.

SUMMARY OF THE INVENTION

The present invention is an apparatus useful in improving the rate of growth, size at maturity, overall health, environmental impact, and total production cost associated with the cultivation of beneficial plant life (Hereinafter "plants").

The present invention facilitates improvements in the growth rate, overall health and size of plants at maturity via improvements in controls over the innate responses of plants to:
  1) Gravitational forces (Geotropic response).
  2) Light direction and intensity (Phototropic response).
  3) The quantity and direction of water sources (Hydrotropic response).
  4) The quantity and bio-availability of nutrients.
  5) The mechanics of different growing mediums.

The present invention improves the environmental impact and total production cost of cultivating plants via reductions in:
  1) Water lost to evaporation, seepage and leakage.
  2) Nutrient (fertilizer) consumption.
  3) Pesticide consumption.
  4) Energy consumption.
  5) Equipment costs.
  6) Arable land space.
  7) Labor.

The present invention utilizes a growing medium filled cylinder (hereinafter "cylinder") as a multi-axial platform for the growth of plants. Cylinders are bearing mounted on a rigid axle supported at its ends by a rack or stand allowing unencumbered rotation of each cylinder along its horizontal axis. Perforations in the cylinder's casing allow plants to form roots in the solid growing medium contained within the cylinder, while leaves, stems, fruit, and flowers develop outwardly.

Rotating the cylinder along its horizontal axis effects the geotropic response of the plants rooted within. Experiments with prototypes of this invention have confirmed that changing the orientation of plants in the cylinder with respect to gravity has a beneficial effect on their overall health, size at maturity, and morphology.

Rotating outward growing plants eliminates the need for controlling the direction of the light sources required for photosynthesis. As the cylinder presented in this application rotates, it exposes both the top, under, and edge sides of all leaves and stems to light emanating from all directions. This is of unique benefit as the majority of the cells responsible for photosynthesis (Stomata) are found on the underside of leaves. When a larger number of stomata are exposed to an increased amount of light during the inversion phase of a 360 degree rotation, the efficiency of the photosynthetic process is improved.

The rotating cylinder utilized in the present invention also serves to enhance the efficiency of the drip and wick irrigation assembly located at the center of each cylinder. The rigid stationary axle supporting the cylinder is perforated along its length to allow for the controlled channeling of water and liquid nutrients to the growing medium contained within the cylinder. A larger casing consisting of perforated plastic pipe wrapped in a fabric silt sleeve is used to enclose the fluid bearing rigid axle.

Liquids from perforations in the rigid axle drip onto the inner wall of the plastic pipe casing. These liquids then drip onto the fabric silt sleeve through perforations in the plastic pipe casing. The centrifugal and gravitational forces resulting from rotation act to evenly wick fluids from the wet fabric silt sleeve throughout the growing medium. Irrigating in this manner facilitates even hydration, and minimizes water and liquid nutrient consumption while encouraging robust deep rooting in compliance with the hydrotropic response innate to all plants.

The present invention utilizes a unique planting/harvesting basket design (Hereinafter "basket) to minimize the labor, equipment, pollution and related costs associated with cultivation using the modalities normally associated with open field farming. The design of the basket allows the roots of plants to pass readily through the frame of the basket while a stable root ball is formed and retained in the basket.

Prior to transplanting into a cylinder, a plant is started from seed in a basket. When sufficiently mature, plants growing in baskets are transplanted into perforations through the outer casing of the cylinder. These perforations contain rectangular keyways that engage locking tabs located on each basket. These tabs hold the basket in place allowing the plant growing within to expand its root system into the growing medium contained in the cylinder.

In preparation for transplanting, holes matching the size and shape of each basket are excavated in the growing medium. Mating the size and shape of receiving holes to the existing size and shape of the basket and the root system it contains minimizes the need to reshape the root system to fit an irregularly shaped hole. This modality minimizes the root trauma of normal dig and plant transplanting. Low trauma transplantation encourages rapid rooting and the hydrotropic benefits of irrigation from beneath the root system of plants in the outer casing provides the benefits described above.

Plants growing in baskets are harvested by twisting the basket in a circular motion. This action causes the sharp edges of the basket's frame to sever the plant's roots while excavating a hole sized to receive the next basket and starter plant.

In order to expand the number and kind of plants suitable for cultivation in the present invention, scaffolding of various shapes and sizes is affixed to the exterior of the cylinder. This component of the apparatus provides support for taller and more fragile plants that might otherwise sustain damage due to the mechanical and gravitations stressors induced by rotation of the cylinder.

The stationary axle and modular cylinder design of the present invention allow for easy, stable and space efficient racking in vertical configurations. This reduces the footprint of land required for the production of desirable plant life as well as improvements in land procurement and operational cost efficiencies. Avoiding the instability induced by complex planetary rotation dependent designs, the stationary axle design utilized in the present invention can be scaled up to very large dimensions and weights.

The foregoing description of specific embodiments of the present invention are presented for illustrative and descriptive purposes. They are not intended to limit use of the invention to the precise forms disclosed. Many modifications and variations of this invention are possible in light of the information provided. The embodiments described are provided to explain the principles of the invention and some of the practical implications thereof.

DETAILED DESCRIPTION OF THE INVENTION

Figure 1:
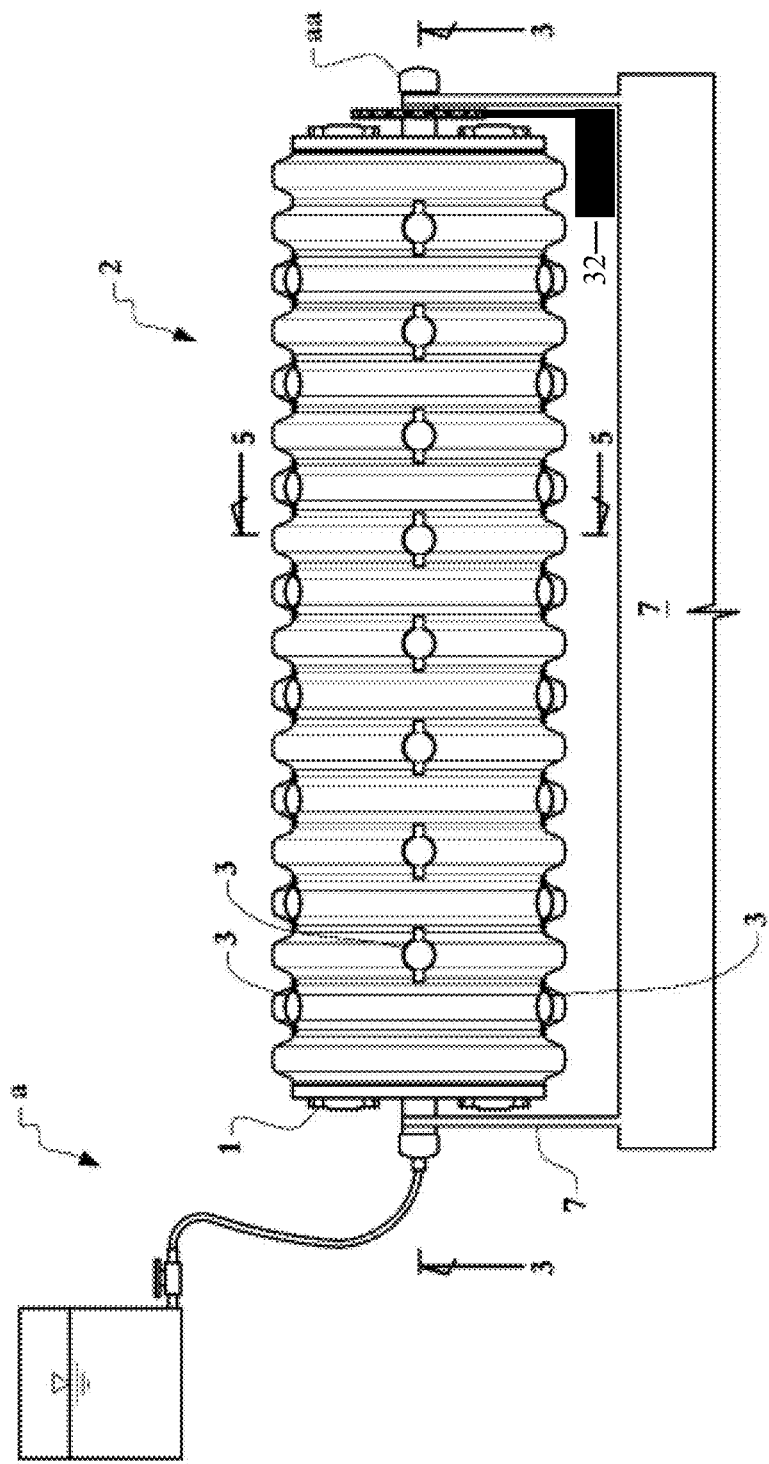
FIG. 1: Front elevation view of basic apparatus
Figure 2:
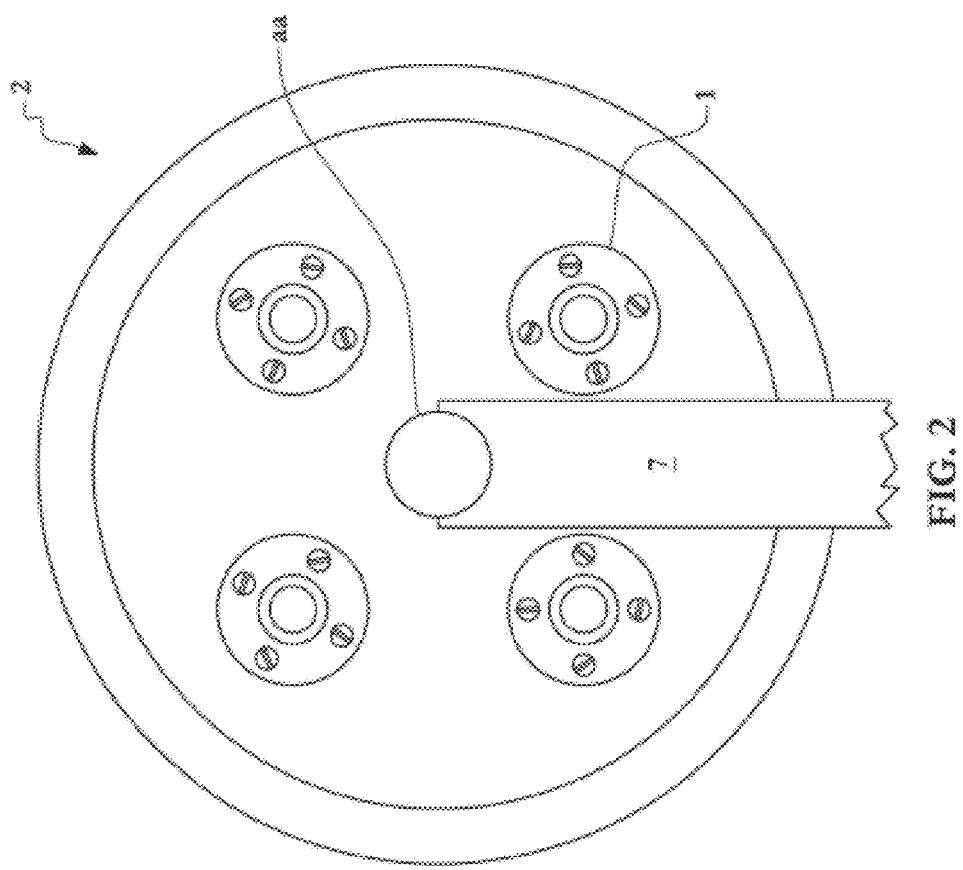
FIG. 2: Detail view of cylinder end cap.
Figure 3:
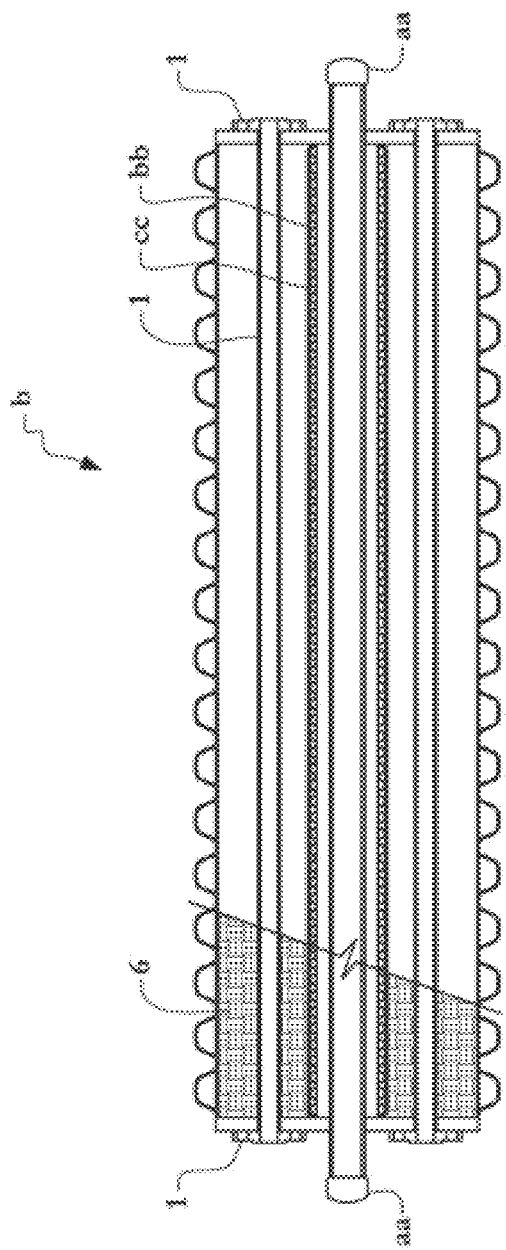
FIG. 3: Longitudinal cut away view of cylinder demonstrating orientation of internal components.
Figure 4:
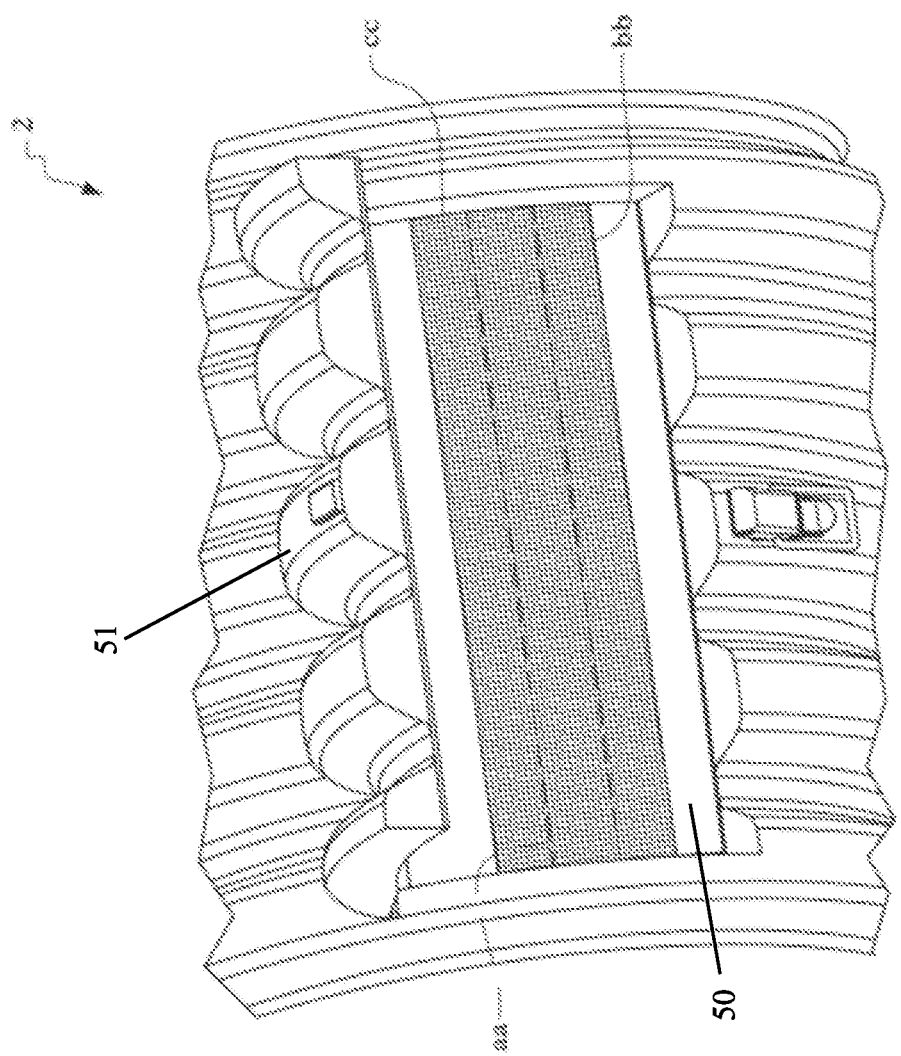
FIG. 4: View of cylinder and a portion of interior with access hatch opened.
Figure 5:
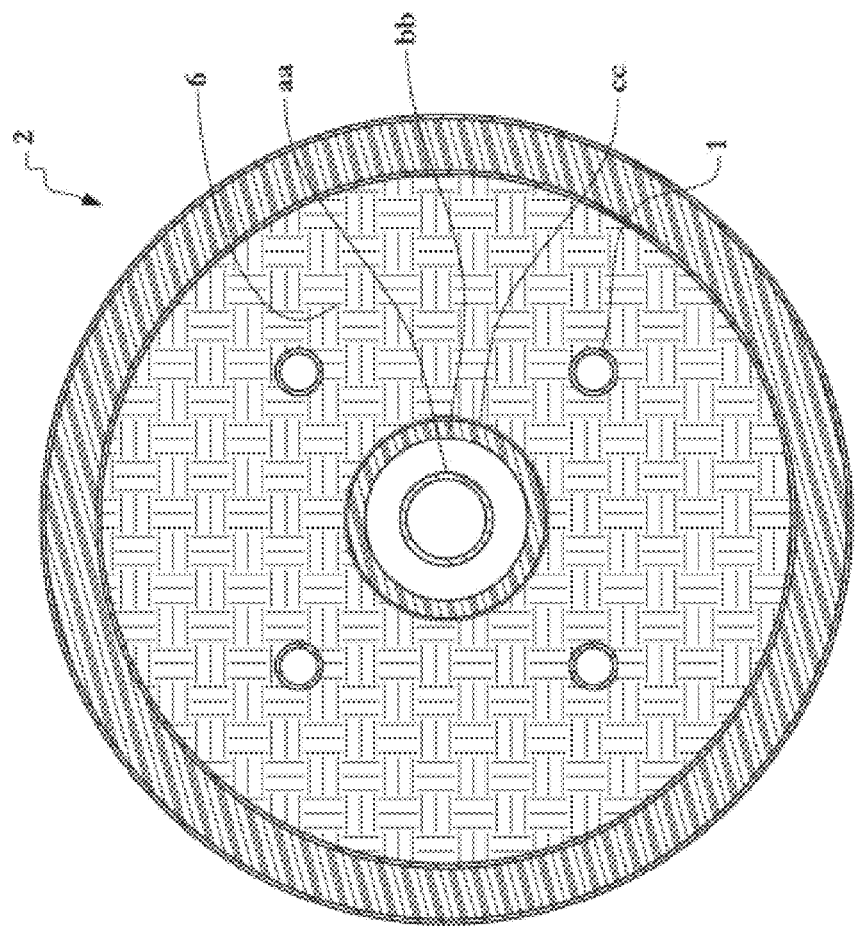
FIG. 5: Cross section view of cylinder.
Figure 6:
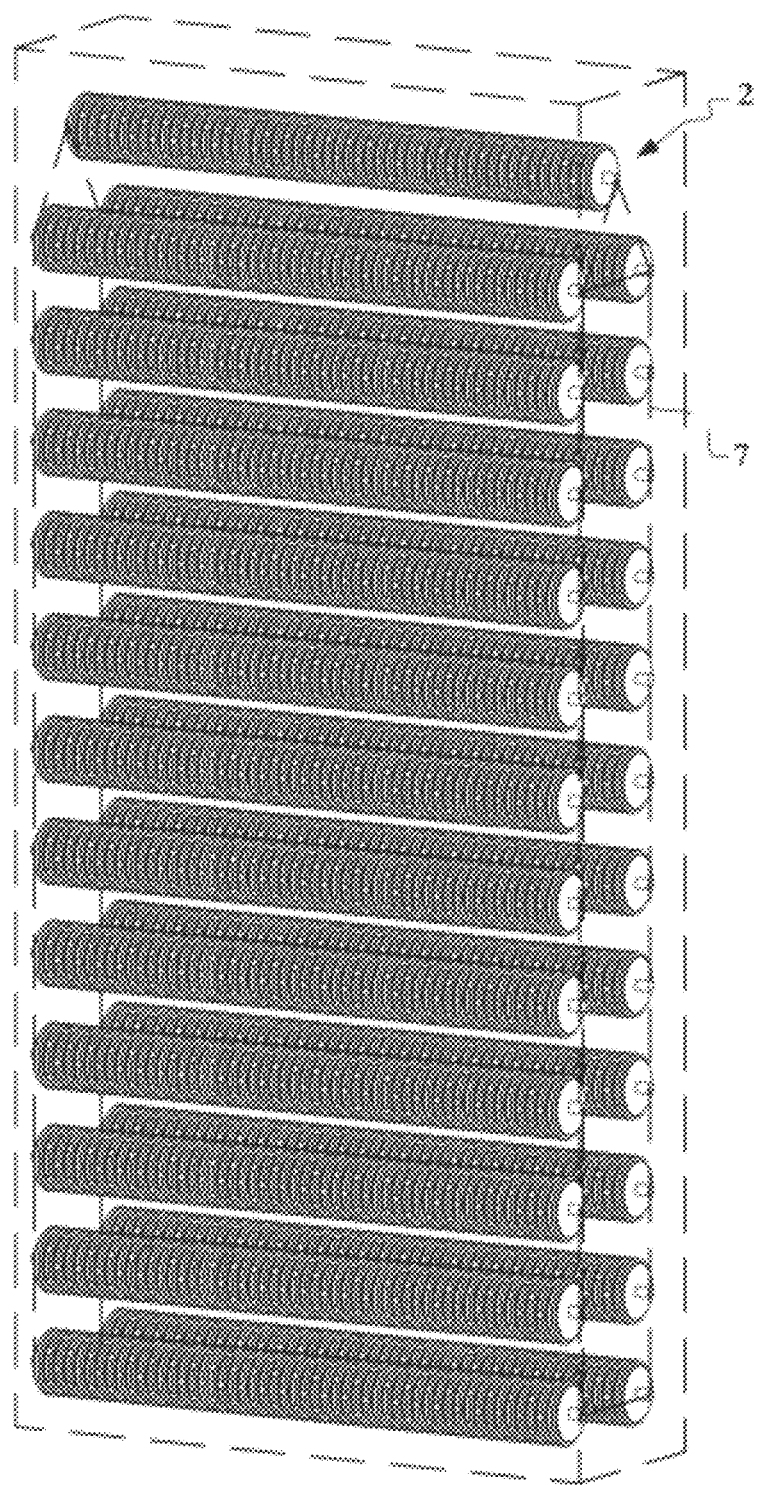
FIG. 6: Depiction of multiple cylinders racked in tower.
Figure 7:
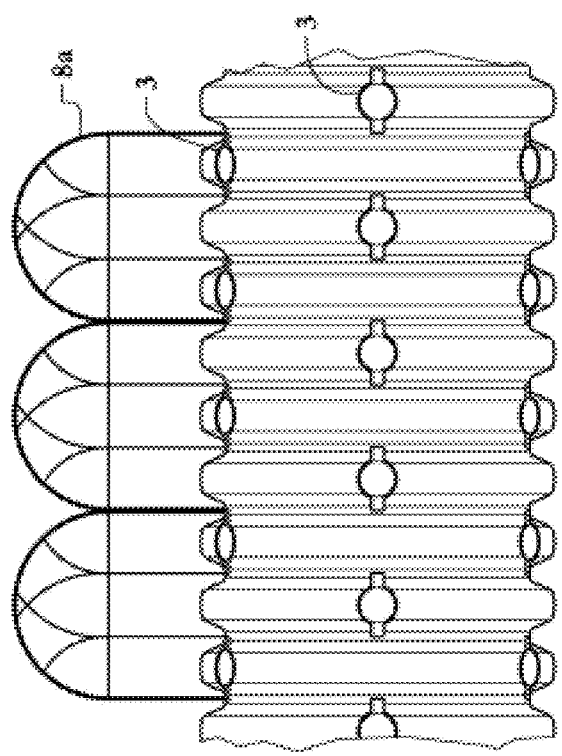
FIG. 7: View of cylinder with in-line scaffolding.
Figure 8:
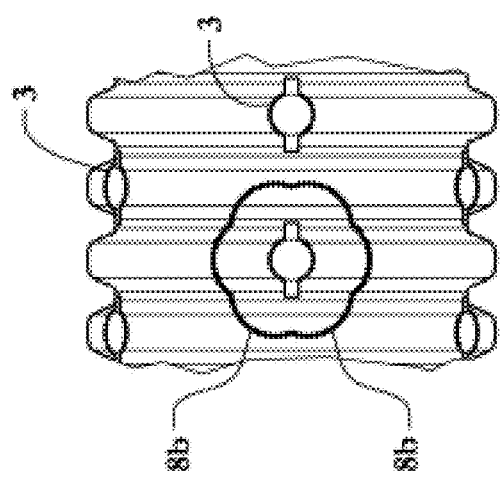
FIG. 8: View of cylinder with detail of perforations with keyways and top view of circular scaffolding.

The prototypes of this invention (see FIG. 1) were constructed of eighteen to twenty four inch diameter smooth wall and corrugated PVC culvert pipe sections (Hereinafter "Cylinders") 2. Metal, concrete, plastic or wood cylinders of any diameter can also be used.

Holes (Hereinafter "perforations") 3 are cut into each cylinder's 2 outer wall in order to allow access to the growing medium contained within. Each perforation 3 is large enough to accommodate healthy root and stem growth but small enough to prevent the growing medium from escaping. Plants rooted in each perforation 3 grow outward away from the axis of rotation that runs through the center of the cylinder 2. The roots of each plant develop inward toward the axis of rotation.

Each cylinder 2 is mounted on a rigid axle aa made of steel pipe or any other suitable material passing through its center (the axis of rotation). The rigid axle aa extends outwardly approximately twelve inches past the end of the cylinder 2 providing a stable point for mounting the cylinder on a rack, stand or tower 7. Holes are drilled in the rigid axle aa in order to allow water and liquid nutrients to flow through it to the growing medium contained in the cylinder 2.

Each cylinder 2 is supported and spaced from the rigid axle by circular spoke disks 22 made from marine grade plywood or other suitable material. The outer diameter of each spoke disk 22 is slightly smaller than the internal diameter of the outer surface layer of the cylinder 2. Smaller circles cut in the center of each spoke disk 22 provide spaces into which sealed ball bearings are pressed. The inner race of each bearing 24 rests on the rigid axle aa and the outer race turns with the spokes and cylinders. Spoke disks are placed at regular intervals along the length of the rigid axle aa.

To seal the ends of the cylinder 2, two circles of plywood or other suitable material are cut slightly larger than the exterior dimensions of the cylinder 2. These are then attached to two spoke disks 22 of the kind described above. Bearings 24 are mounted at the center of these end/cap spoke disk assemblies 23. Affixing end caps 23 to spoke disks 22 allows them to turn in unison around the rigid axle aa.

To hold the end caps in place while adding additional strength to the cylinder, threaded steel rods, pipes or cables (Hereinafter "battens") 1 run end to end through the interior of the cylinder parallel to the rigid axle aa. These battens 1 pass through holes 21 in the spoke disks 22 as well as corresponding holes in the end caps 23. A portion of each batten 1 protrudes beyond the end cap 23. Nuts or other suitable fasteners are used to tighten the battens 1 applying tension to the cylinder 2 along its length.

The rigid axle aa at the center of each cylinder is encased in sections of perforated PVC pipe bb. These outer sections of perforated PVC pipe bb are covered with a fabric silt sleeve cc preventing growing medium 6 from blocking perforations in the rigid axle aa. Liquids flowing from the rigid axle aa drip into the perforated PVC pipe bb surrounding it. These liquids then drip into the fabric silt sleeve cc through openings in the perforated PVC pipe bb. The fabric of the silt sleeve cc then distributes these liquids evenly via a wicking action. This action assures even, well controlled distribution of liquids to the growing medium 6 contacting the silt sleeve cc. Liquids communicated to the growing medium in this way are further distributed by the gravitational and centrifugal forces associated with the rotation of the cylinder 2.

Once assembled and mounted on a rack, stand, or tower 7, each cylinder 2 is turned by means of a chain, belt or gear drive attached to one of the end caps 23 of the cylinder 2. The rigid axle aa remains static as a sprocket, pulley, or gear assembly attached to the end cap 23 rotates the cylinder 2 along its horizontal axis. Electric motors and chain drives have been used to propel prototype cylinders 2 but the energy needed to accomplish rotation of the cylinder 2 can be provided by any suitable electrical, mechanical, hydraulic or pneumatic source. The mechanical connection between the power source and the cylinder 2 can be of any suitable kind.

The opposite end of the rigid axle aa from the one employed for mounting of a sprocket, pulley or gear drive is capped with a fitting that allows for the attachment of a hose, tubing, or piping (see FIG. 1 ref. a). Water and liquid nutrients are introduced into the rigid axle aa through this fitting. Liquids introduced to the rigid axle aa in this way drip into the silt sleeve cc covered perforated PVC pipe bb encasing the axle aa. The silt sleeve fabric cc becomes wet and this moisture wicks into the growing medium 6 contained in the cylinder 2 as described above.

Figure 9:
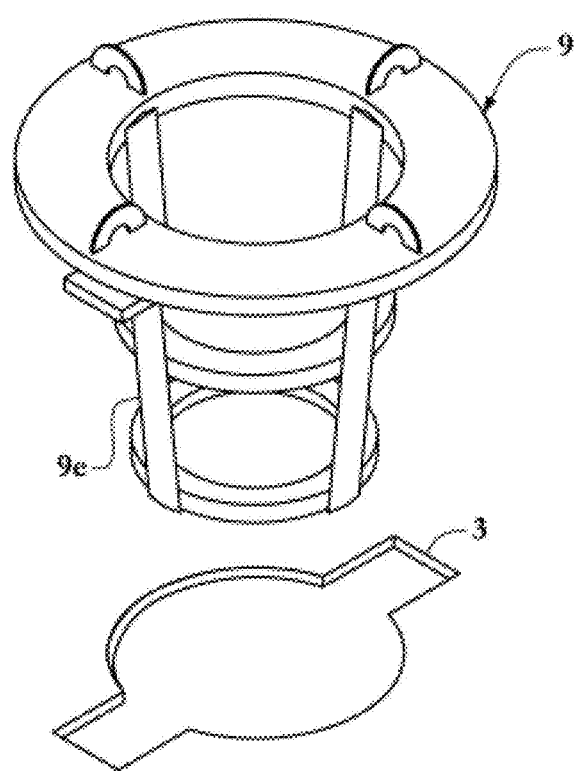
FIG. 9: Detail view of planting/harvesting basket and perforation in cylinder with keyway.

Seeds or starter plants are introduced into the cylinder 2 via transplantation utilizing a unique planting/harvesting basket (hereinafter "basket) (see FIG. 9).

The growth cycle of a plant begins when a seed is introduced to a volume of growing medium in a basket 9 that has been placed in a solid container. The seed is allowed to germinate, sprout and grow to a transplantable age in the growing basket 9. The normal course of root development forms and stabilizes a transportable root ball inside of the basket 9.

Figure 10:
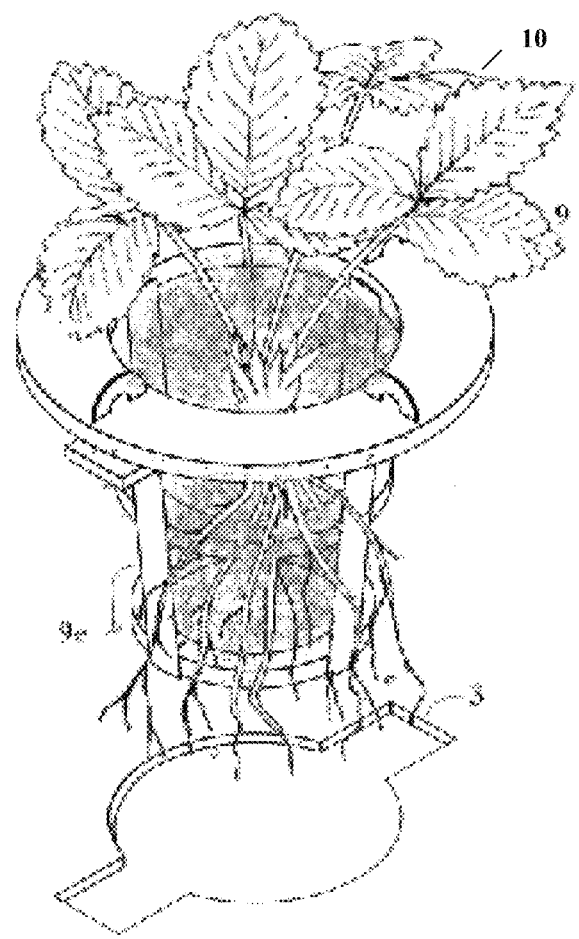
FIG. 10: Detail view of planting/harvesting basket and perforation in cylinder with keyway.
Figure 11:
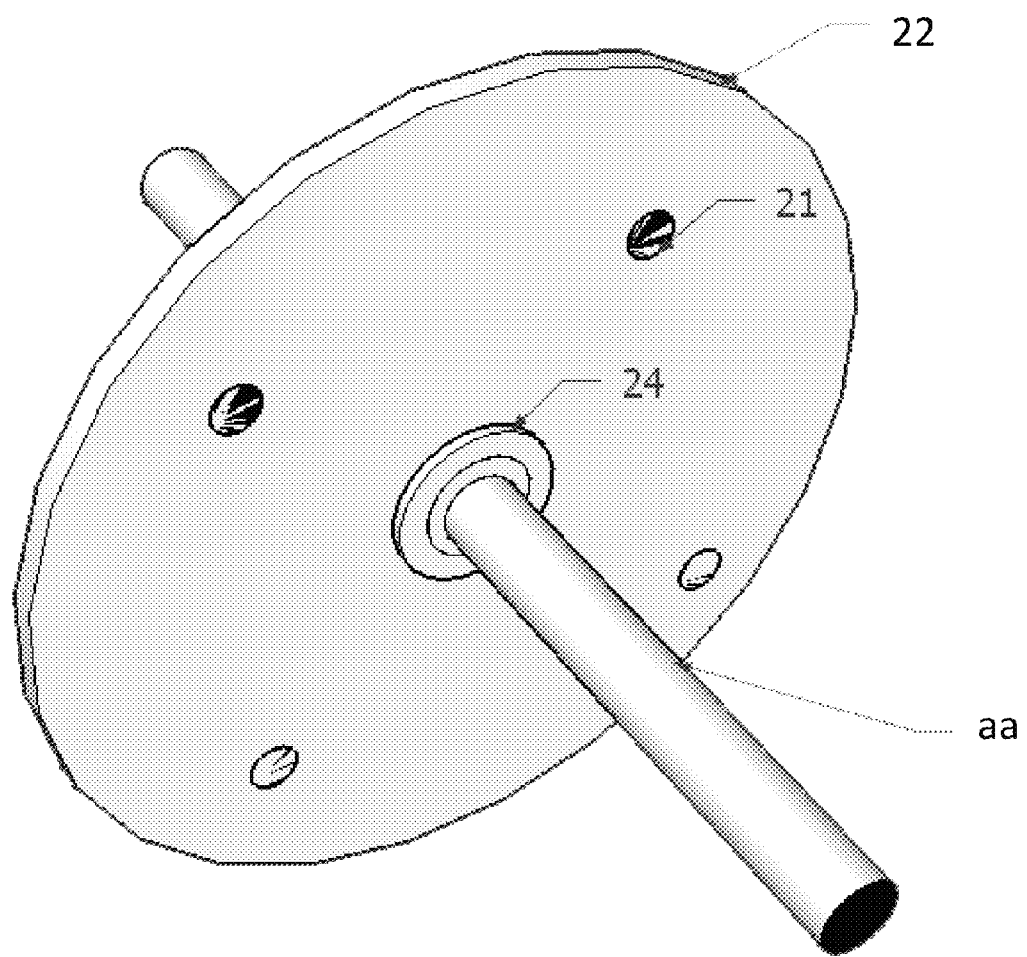
FIG. 11: Detail view of spoke disk.
Figure 12:
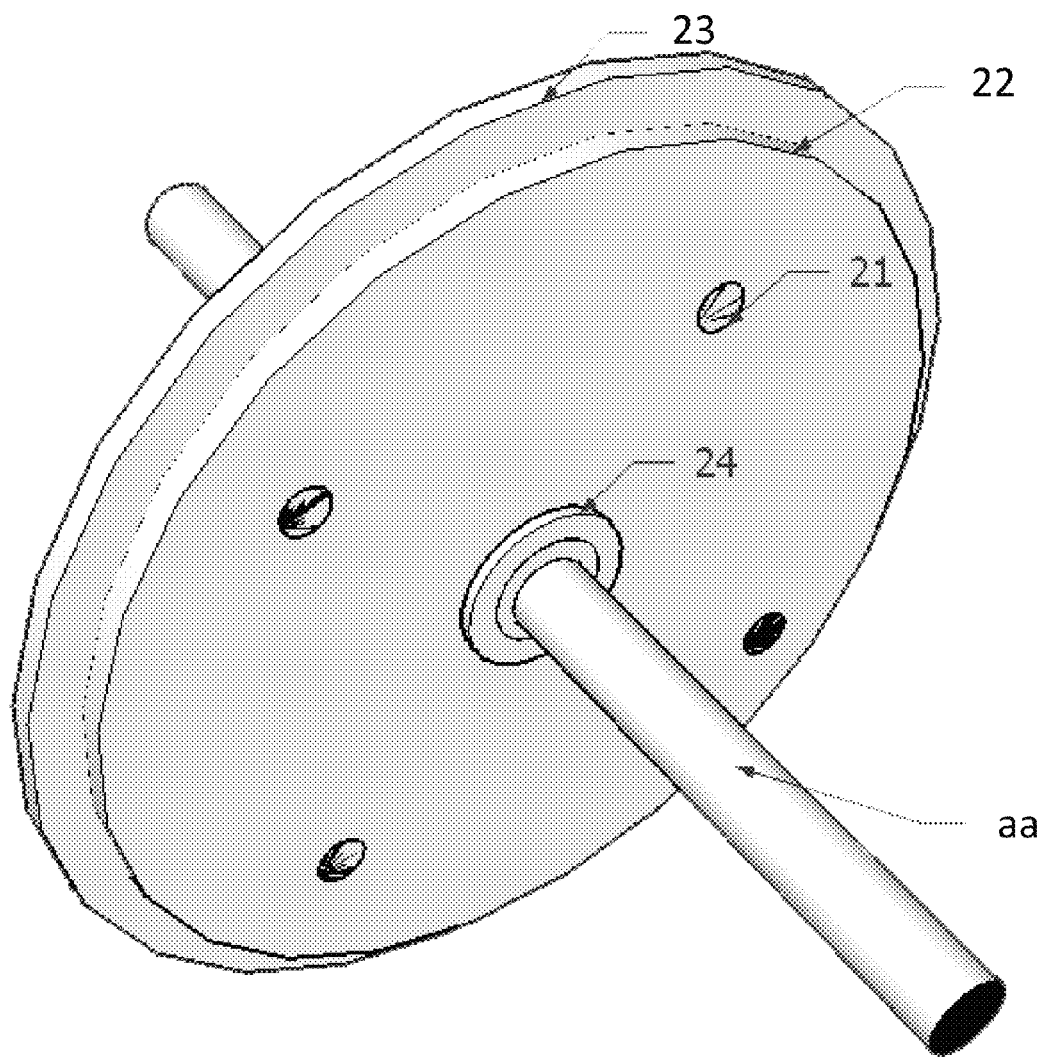
FIG. 12: Detail view of end cap.
Figure 13:
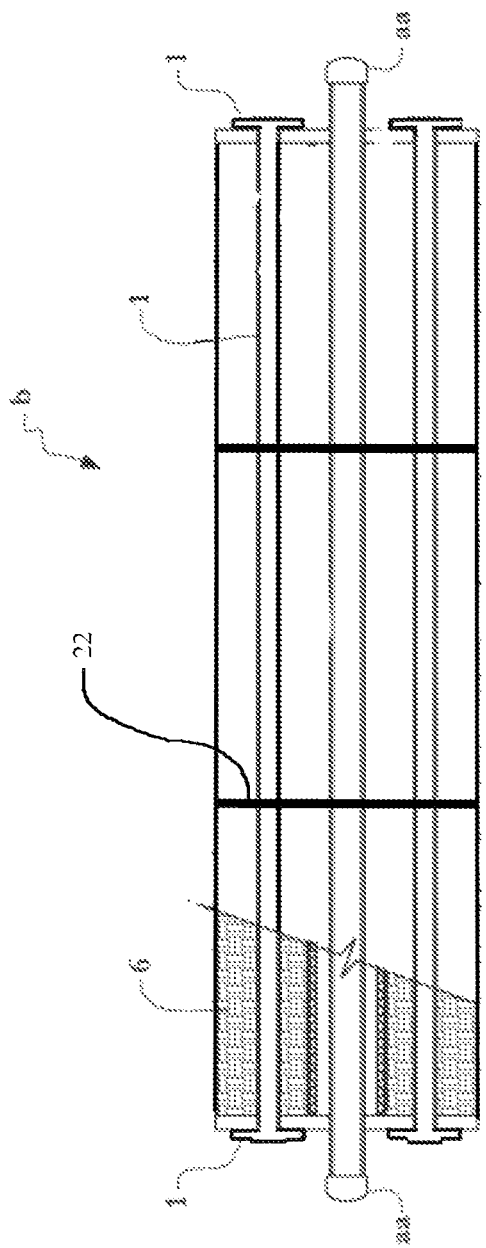
FIG. 13: Longitudinal cut away view of cylinder demonstrating orientation of internal components.

Baskets 9 containing seeds or starter plants (see FIG. 10) are transplanted into perforations 3 that match the size and shape of the basket 9 in order to limit any deformation of the root ball it contains. This modality limits damage to the plant's root system as well as the stunting and death that sometimes result from such trauma.

When mature, plants are harvested by twisting the basket 9 that contains them in a circular motion. This causes the sharpened edges of the basket's frame 9e to sever protruding roots while excavating a root ball that remains in the basket 9. This action also excavates a hole sized and shaped to receive another basket 9 containing a seed or starter plant.

When required, elevated scaffolding 8a is utilized to support taller and more fragile plants during their growing cycle. The rigors of rotation through the earth's gravitational field can damage plants unless they are properly supported. Scaffolding 8a of the kind utilized in this invention varies in size, design and materials. In all instances scaffolding 8a is affixed to the cylinder 2, provides an elevated point(s) of support for plants growing in the cylinder 2, and is sized and shaped to provide the most practical and efficacious mix of support applicable to a given size and type of plant.

In trials utilizing working prototypes of this apparatus, the present invention proved to be effective at improving the efficiencies of the factors generally considered to be most critical to the production of beneficial plant life (Hereinafter "plants"). Key to these improved efficiencies is the fact that this invention relies on a matrix of components that act together in a synergistic manner:

1) Controlled rotation of prototype cylinders 2 beneficially affected the geotropic response of the test plants. This effect was noticeable in the form of consistently accelerated growth rates and improved size and morphology of cylinder 2 grown plants compared to controls.
2) Controlled rotation of prototype cylinders 2 served to more evenly distribute water and liquid nutrients communicated to the growing medium 6 contained within them. A hollow rigid axle aa located at the center of each cylinder 2 was used as a conduit for the irrigation of plants growing through the outer casing of each cylinder 2. An electronic hydrometer was used to determine moisture levels. Water and nutrients introduced at the center of the cylinder—below the root system of plants growing though the outer casing—consistently encouraged deeper rooting ("hydrotropic" response) compared to controls.
3) Controlled rotation of plants growing in prototype cylinders 2 exposed all surfaces of the leaves and stems of such plants to direct and indirect light coming from all directions. Exposure of this kind inhibited each plant's tendency to direct growth toward a dominant light source (Phototropic response). This allowed each plant's energy and metabolic resources to be channeled into growth of the whole plant resulting in improved growth rates and morphology when compared to controls.
4) Controlled rotation of plants growing in prototype cylinders 2 improved the consistency and character of air flow over the leaves and stems of such plants resulting in constant changes in air pressure. It is common knowledge that changes in air pressure benefit the respiration of plants. Constant change in air pressure due to rotation resulted in improved color, growth rate, and morphology when compared to controls.
5) Containing a growing medium 6 mass in prototype cylinders resulted in a significant reduction in irrigation water loss due to evaporation, seepage and leaking. The result has been greatly reduced water consumption against irrigation volumes required for field grown controls.
6) Containing a growing medium mass in prototype cylinders 2 demised by solid spoke disks 22 allowed improved controls over the mechanics of the growing mediums used during experiments. In trials, various compartments within each cylinder were filled with disparate growing mediums possessing different properties (mechanics). In that the mechanics of a given growing medium can exercise a significant influence over the growth of a given plant, the ability to control the mechanics of such mediums contributed to improved plant growth and morphology versus controls.
7) Transplanting young plants into prototype cylinders 2 via conventional dig and bury methods resulted in stunted growth and plant death due to root system trauma. Experimentation with planting/growth baskets 9 mated to like sized perforations 3 excavated in the growing medium 6 within each cylinder 2 resulted in transplantation with limited root system trauma. This improvement in growing and transplanting apparatus resulted in consistently larger, healthier, and faster growing plants.
8) Growing plants to maturity in prototype cylinders 2 demonstrated that the stresses induced by rotation damaged taller and more fragile plants. The use of scaffolding 8a to provide additional points of support for such plants resulted in consistently healthy growth.

I claim:

1. An apparatus for growing plants comprising:
a cylinder that is mounted on a fixed hollow perforated axle permitting the cylinder to rotate around said fixed axle;
a mounting stand to support said axle at its ends to hold the cylinder in a substantially horizontal position;
the axle being perforated along its length to allow the passage of liquids introduced to the hollow axle through an end of the axle to pass through the axle to an inner surface of the cylinder;
the inner surface of the cylinder being permeable to the liquids and impermeable to a plant growth medium;

an outer surface of the cylinder being perforated to allow the rooting of plants through the outer surface of the cylinder;

the inner and outer surfaces of the cylinder being held separate from each other by end caps;

an interior space between the inner and outer surfaces of the cylinder being substantially filled with a plant growth medium;

the cylinder being communicably coupled with a drive source that causes the cylinder to rotate.

2. An apparatus for growing plants comprising:

a cylinder that is bearing mounted on a fixed hollow perforated axle permitting the cylinder to rotate around said fixed axle;

a mounting stand to support said axle at its ends to hold the cylinder in a substantially horizontal position;

the axle being perforated along its length to allow the passage of liquids introduced to the hollow axle through an end of the axle to pass through the axle to an inner surface of the cylinder;

the inner surface of the cylinder comprising two layers;

the one layer being perforated;

the other layer being a silt sleeve that is permeable to the liquids and impermeable to a plant growth medium;

an outer surface of the cylinder being perforated with holes designed to accommodate insertion and fastening of at least one rooting basket to the outer surface of the cylinder;

the rooting basket designed to contain a plant and fastened to the outer surface of the cylinder by an interlocking fastener;

the inner and outer surfaces of the cylinder being held separate from each other by end caps that form flat end surfaces of the cylinder;

the end caps comprising a central hole with a diameter smaller than that formed by the inner surface of the cylinder and larger than that of the axle such that the load of the cylinder is transferred to the axle by the end caps;

an interior space between the inner and outer surfaces of the cylinder being substantially filled with the plant growth medium;

the cylinder being communicably coupled with a drive source that causes the cylinder to rotate.

* * * * *